(12) United States Patent
Yulevich

(10) Patent No.: US 7,878,414 B2
(45) Date of Patent: Feb. 1, 2011

(54) CODE AND A METHOD FOR CODING AND ENCODING INFORMATION

(76) Inventor: Yonatan Yulevich, 52 Hakovshim St, Tel Aviv (IL) 68012

( * ) Notice: Subject to any disclaimer, the term of this patent is extended or adjusted under 35 U.S.C. 154(b) by 0 days.

(21) Appl. No.: 12/177,906

(22) Filed: Jul. 23, 2008

(65) Prior Publication Data

US 2009/0026276 A1  Jan. 29, 2009

Related U.S. Application Data

(60) Provisional application No. 60/952,573, filed on Jul. 29, 2007.

(51) Int. Cl.
  *G06K 7/10* (2006.01)
  *G06K 7/14* (2006.01)
  *G06K 19/06* (2006.01)
  *G06F 15/12* (2006.01)

(52) U.S. Cl. ............... 235/494; 235/454; 235/432; 235/462.12

(58) Field of Classification Search .......... 235/462.02, 235/487, 494, 495
See application file for complete search history.

(56) References Cited

U.S. PATENT DOCUMENTS

| | | | | | |
|---|---|---|---|---|---|
| 4,263,504 | A | * | 4/1981 | Thomas | 235/454 |
| 4,408,121 | A | * | 10/1983 | Galatha | 235/494 |
| 5,023,437 | A | * | 6/1991 | Speicher | 235/432 |
| 5,278,398 | A | * | 1/1994 | Pavlidis et al. | 235/462.12 |
| 5,380,998 | A | * | 1/1995 | Bossen et al. | 235/494 |
| 2006/0255163 | A1 | * | 11/2006 | Bian | 235/494 |

* cited by examiner

*Primary Examiner*—Michael G Lee
*Assistant Examiner*—Laura Gudorf
(74) *Attorney, Agent, or Firm*—Deborah Gador

(57) ABSTRACT

A graphic representation of symbols encoding data, the graphic representation including a reference symbol having a top and a bottom, the reference symbol top and bottom defining opposing limits of a code line, at least one graphic symbol, representing encoded information regarding a static road condition for processing by a vehicle moving along the road, disposed between the opposing limits of the code line, wherein the information is represented by a ratio of a height of each graphic symbol to the height of the reference symbol and by each symbol's position relative to the opposing limits of the code line, and wherein the reference symbol indicates a beginning of encoded information and a direction for decoding the encoded information.

6 Claims, 1 Drawing Sheet

CODE AND A METHOD FOR CODING AND ENCODING INFORMATION

FIELD OF THE INVENTION

The present invention relates to codes in general and, in particular, to a method for encoding numerical and textual information in a visual code.

BACKGROUND OF THE INVENTION

Codes and coding have been known for many years as implements for compressing complex information, or for hiding secret or sensitive information. Codes span many fields of human invention, from secret military communication, to compressed computer information for broadband.

In the wide field of codes, there are also visual codes that allow information to be presented visually. An example of such a code is a bar code. A bar code consists of a series of vertical bars of varying widths, in which each of the digits, zero through nine, is represented by a different pattern of bars that can be read by a laser scanner. The bar code scanner must be stationary in order to enable correct reading of the code.

Accordingly, there is a long felt need for a code that can be reliably read at a high-speed, relative movement, between the scanned code and the scanner.

SUMMARY OF THE INVENTION

There is provided according to the present invention a code for reading by means of a static scanner or a scanner moving at high speeds, the code comprising a reference symbol defining a top and a bottom of a code line, a maximum height of a code symbol, and the direction of encoding of said code line, at least one code symbol whose height relative to the reference symbol and whose position relative to the top or bottom of the code line represent information.

According to one embodiment of the invention, each code symbol of the code is a rectangular bar.

According to another embodiment of the invention, two consecutive code symbols are evenly spaced a predetermined distance apart or not spaced apart, but are adjacent one another. The code uses the absence of a space between two consecutive code symbols to indicate an alphabetical character.

According to yet another embodiment of the invention there is provided a method for creating a code. The method includes the steps of providing a reference symbol for defining a top and a bottom of a code line and a maximum height of a code symbol, and providing at least one code symbol whose height relative to the reference symbol and whose position relative to the top or bottom of the code line represent information.

BRIEF DESCRIPTION OF THE DRAWINGS

The present invention will be further understood and appreciated from the following detailed description taken in conjunction with the drawings in which.

DETAILED DESCRIPTION OF THE INVENTION

The invention relates to a method for representing information as graphical symbols (hereinafter "code"). According to one embodiment of the invention, numerical and textual data can be represented by the code.

The code of the present invention comprises a sequence of symbols disposed one next to the other (hereinafter a "code line"). A reference symbol at the beginning of the code line extends between opposing limits of the code line, thereby defining a maximal height of the symbols and a "top" and "bottom" of the code line. The reference symbol further extends in parallel to the limits of the code line, thereby defining the direction of decoding of the code line. The symbols represent information as a ratio between the height of each symbol and the height of the reference symbol, the position of the symbol in relation to the top and bottom of the code line and the space or its absence between two consecutive symbols. The code can be decoded using a decoding key. Preferably, the reference symbol indicates the beginning of the coded information and the direction of its decoding.

According to one embodiment of the present invention, the code consists of 13 symbols. One of these symbols is the reference symbol, and preferably it indicates the beginning of the coded information, the code line limits and the direction of the decoding. The symbols utilized can be of any size, shape, color or distance from one another, and may evenly spaced apart from one another at a predetermined distance or non-spaced (i.e., adjacent), as long as they have a clearly defined height to permit an accurate measurement. They can be implemented in any way (e.g., painting, impression, lighting, projection onto a screen, etc. . . . ) as long as there is sufficient contrast between the symbols and the background to allow measurement of the height and position of each symbol and differentiation between consecutive symbols during high-speed scanning. By combining the different symbols and discerning spaced and non-spaced consecutive symbols, it is possible to express substantially any textual letter and any number in any language. In a preferred embodiment of the invention, the symbols are spaced or non-spaced bars of different heights.

Figure 1:
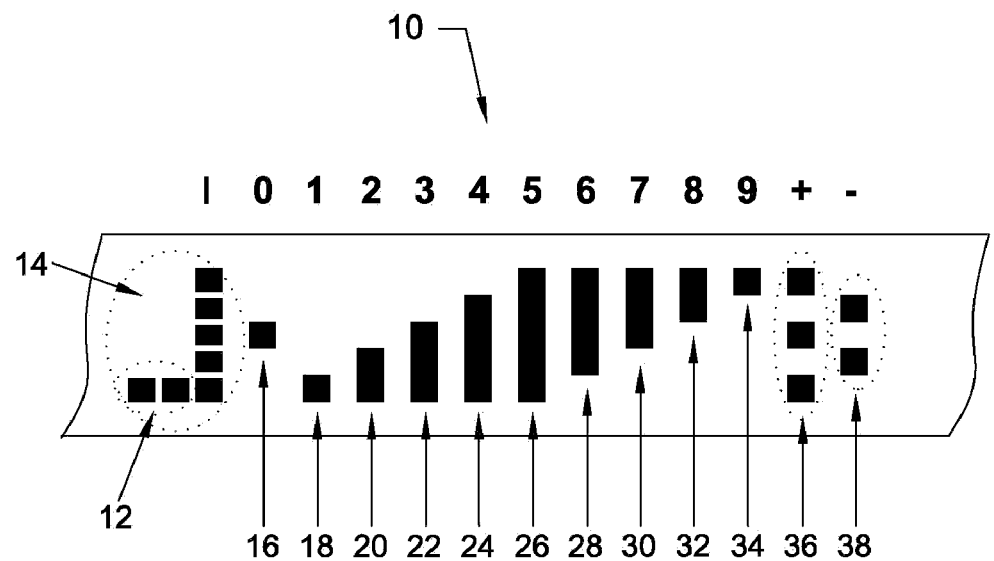
FIG. 1 is a schematic illustration of a decoding key in accordance with one embodiment of the present invention.

Referring to FIG. 1, there is shown a schematic illustration of a decoding key 10 for a code constructed and operative in accordance with one embodiment of the present invention. Key 10 is a decoding key consisting of rectangular bars of different heights. In this embodiment, symbol 14 is a reference symbol and defines the maximal height of the symbols and the top and bottom of the code line. Portion 12 of reference symbol 14 defines the direction of decoding (in this instance left to right). Each symbol's height is measured with relation to the reference symbol, and each symbol's position relative to the code line is measured with relation to the top and bottom of the reference symbol. Symbols 16, 18, 20, 22, 24, 26, 28, 30, 32, and 34 are symbols that express, in this example, numerals from 0 to 9. Symbols 36 and 38 express the textual symbols + and −, respectively. Two non-spaced apart consecutive symbols may express a font which is set in a numerical order according to the alphabetical order. For example, in English A=1, B=2 etc. It will be appreciated that many variations and modifications may be made to the proposed code language.

Figure 2:
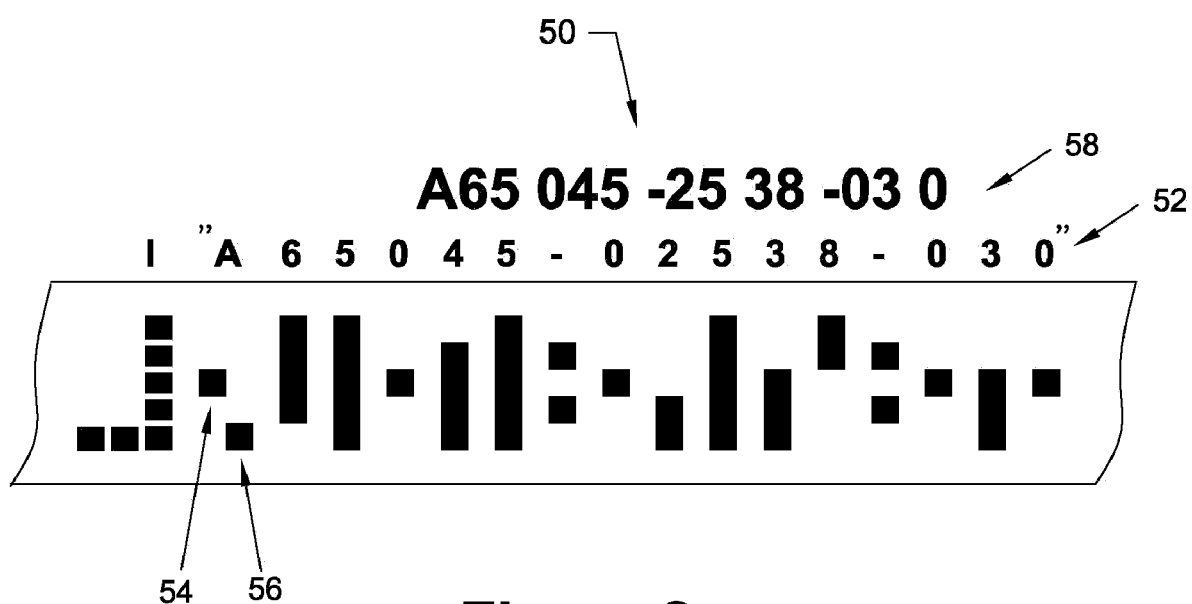
FIG. 2 is a schematic illustration of a coded message according to one embodiment of the invention.

Referring now to FIG. 2, there is shown a schematic illustration of a coded message 50 according to one embodiment of the invention. Coded message 50 can be decoded using decoding key 10 (illustrated in FIG. 1). The result of decoding each of the symbols, illustrated in FIG. 2 as rectangular bars, of the code of message 50 by using decoding key 10 is: "01-65045-02538-030" (marked 52). However, since symbols 54 and 56 are not spaced, they do not represent two numerals "01" but, rather, a single letter, here shown as the letter "A". Similarly, "02" may represent "B", etc. Therefore, as shown in FIG. 2, the first step of decoding the coded message 50 results in: "A65045-02538-030" (marked 58).

It is a particular feature of the invention that the code can be read by means of a static scanner or a scanner moving in a direction perpendicular to the height of the code line, even at great speed, such as 50 meters per second. Either, neither or both the coded information and the scanner can move relative to one another during scanning. This permits real-time conversion of alphanumeric characters, represented by graphic or visual code, to digital data, which can be decoded and utilized by a computer application. The coded information can be read from close up or far away (depending on the size of the code symbols and the scanner type), from any direction and at various angles, regardless of the absolute size or position of the coded information, by means of conventional scanners, such as cameras. The best results can be achieved by reading the code from an angle between about +60° and −60° to the horizontal and between about +60° and −60° in the vertical. For decoding coded information 50, the height of each symbol scanned at a given angle is compared to the height of the reference symbol scanned at that same angle.

Preferably, the code line can be read continuously. That is, there is no need to read all the symbols of the code line before beginning to decode the information. The decoding can occur in real time, symbol by symbol, during scanning.

The code line can be read using a variety of optical or non-optical devices, such as: stills camera with suitable shutter speed, video camera, laser scanner, infrared scanner, light scanner, etc. The lens size, scanning field and the scanning angle should be selected according to the code line height, the distance of the reader from the code line, and the scanning speed.

In a preferred embodiment, the scanning device is coupled to a processing unit provided with a software application that receives the data from the scanner in real time and converts it, in real time, to digital data form. Then, the processing unit can decode the coded information using a suitable digital decoding key. It will be appreciated that the scanning device and the processing unit can be mounted in a single housing.

According to another embodiment, the information to be encoded is not graphical symbols, but consists of information which is compressed into alphanumerical code that can be encoded to the graphical code using an appropriate coding key. In this case, the processing unit can include an additional computer program for interpreting the decoded information.

The code according to the present invention can replace bar codes in a variety of applications. It is suitable for encoding data that is relevant to drivers as they drive along a road. In particular, it can be utilized to encode data regarding static road conditions, for real-time processing in a vehicle, as described in detail in Applicant's co-pending patent application entitled, "A System and Method for Providing a Driver of a Vehicle In Advance With Road Information". In addition, the code according to the present invention is suitable for use in encoding food products and/or their packaging, or any other products and/or their packaging which are customarily marked by bar codes for information and/or identification purposes. For example, in the food industry, there is a need to provide enhanced information on the products. Instead of the bar code product identification and additional printing for indicating dates used today, the code of the present invention can be used to represent all the information desired to be printed on the product. It is an important feature of the code according to the present invention that it can convey information using an unlimited number of letters and numbers, at very high speeds.

While the invention has been described with respect to a limited number of embodiments, it will be appreciated that many variations, modifications and other applications of the invention may be made. It will be further appreciated that the invention is not limited to what has been described hereinabove merely by way of example. Rather, the invention is limited solely by the claims which follow.

The invention claimed is:

1. A graphic representation of symbols encoding data, the graphic representation comprising:

a reference symbol having a top and a bottom, said reference symbol top and bottom defining opposing limits of a code line;

at least one graphic symbol, representing encoded information regarding a static road condition for processing by a vehicle moving along a road, said at least one graphic symbol being disposed between said opposing limits of said code line;

wherein said information is represented by a ratio of a height of each said graphic symbol to the height of said reference symbol and by each said symbol's position relative to said opposing limits of said code line; and wherein said reference symbol indicates a beginning of encoded information and a direction for decoding said encoded information; and, wherein one said graphic symbol, disposed spaced apart from another of said graphic symbols in said code line, represents one alphanumeric symbol; and two of said code symbols, disposed on said code line not spaced apart from one another, together represent another alphanumeric symbol.

2. The graphic representation according to claim 1, wherein each said symbol is a rectangular bar.

3. A method for representing information regarding a static road condition, the method comprising:

providing a reference symbol having a top and a bottom, said reference symbol top and bottom defining opposing limits of a code line;

disposing, between said top and said bottom of said code line, at least one graphic symbol representing encoded information regarding a static road condition, for processing by a vehicle moving along a road;

representing said information by a ratio of a height of each said graphic symbol to the height of said reference symbol and by each said symbol's position relative to said opposing limits of said code line; and indicating by means of said reference symbol a beginning of encoded information and a direction for decoding said encoded information; and, wherein said step of providing at least one graphic symbol comprises:

disposing one said graphic symbol spaced apart from another of said graphic symbols in said code line, said one symbol representing one alphanumeric symbol; and disposing two of said code symbols on said code line not spaced apart from one another, said two symbols together representing another alphanumeric symbol.

4. The method according to claim 3, wherein each said graphic symbol is a rectangular bar.

5. A graphic representation of symbols encoding information, the graphic representation comprising:

a reference symbol having a top and a bottom, said reference symbol top and bottom defining opposing limits of a code line;

at least one graphic symbol representing encoded information for reading by a scanning device, said at least one graphic symbol being disposed between said opposing limits of said code line;

wherein said information is represented by a ratio of a height of each said graphic symbol to the height of said reference symbol and by each said symbol's position relative to said opposing limits of said code line; and wherein said reference symbol indicates a beginning of encoded information and a direction for decoding said encoded information; and wherein one said graphic symbol, disposed spaced apart from another of said graphic symbols in said code line, represents one alphanumeric symbol; and two of said code symbols, disposed on said code line not spaced apart from one another, together represent another alphanumeric symbol.

6. A method for representing information, the method comprising:

providing a reference symbol having a top and a bottom, said reference symbol top and bottom defining opposing limits of a code line;

disposing, between said top and said bottom of said code line, at least one graphic symbol representing encoded information for reading by a scanner;

representing said information by a ratio of a height of each said graphic symbol to the height of said reference symbol and by each said symbol's position relative to said opposing limits of said code line; and indicating by means of said reference symbol a beginning of encoded information and a direction for decoding said encoded information;

wherein said step of providing at least one graphic symbol comprises:

disposing one said graphic symbol spaced apart from another of said graphic symbols in said code line, said one symbol representing one alphanumeric symbol; and disposing two of said code symbols on said code line not spaced apart from one another, said two symbols together representing another alphanumeric symbol.

* * * * *